April 17, 1928.

T. C. GATTI 1,666,374

GARDEN TOOL

Filed April 19, 1926

WITNESSES

Inventor
TONY C. GATTI
By Richard B. Owen
Attorney

April 17, 1928.  1,666,374
T. C. GATTI
GARDEN TOOL
Filed April 19, 1926  2 Sheets-Sheet 2
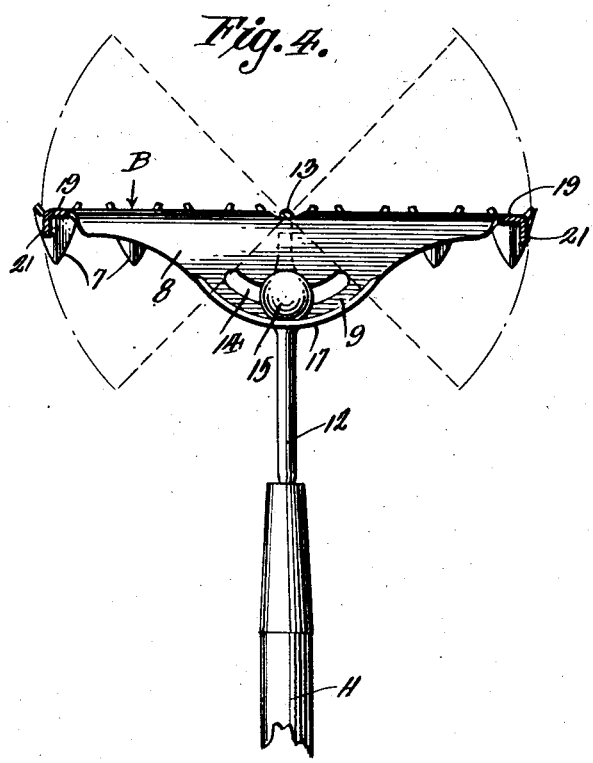
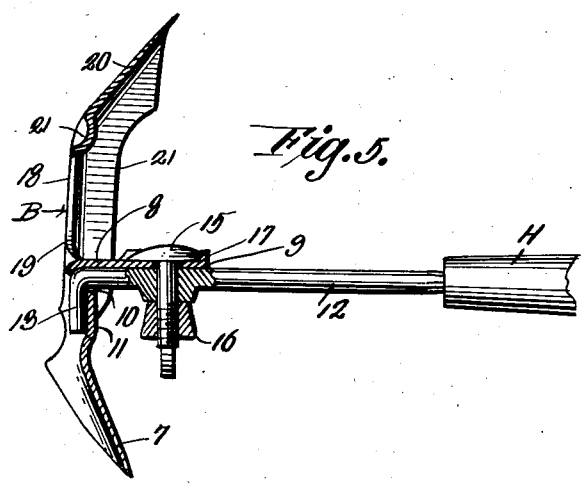
WITNESSES
Inventor
TONY C. GATTI
By Richard B. Owen
Attorney Patented Apr. 17, 1928.

1,666,374

UNITED STATES PATENT OFFICE.

TONY C. GATTI, OF PASCAGOULA, MISSISSIPPI.

GARDEN TOOL.

Application filed April 19, 1926. Serial No. 103,137.

This invention relates to garden tools, and has more particular reference to an improved hand tool for use in cultivating, weeding and analogous operations.

The primary object of the invention is to provide a garden tool of the above kind which is extremely simple and durable in construction as well as efficient in use.

A further object is to provide an improved garden tool including a body member constructed in an improved manner from a single sheet of metal so as to be of durable and efficient form and to include a head provided with cultivator or rake teeth and a weeding blade integrally connected to the head.

A still further object is to provide a garden tool of the above kind wherein simple and effective means is provided for pivotally and adjustably attaching a handle to the head whereby the latter may be positioned at right angles to the handle when employing the tool for raking or cultivating purposes, or obliquely to the handle when employing the weeding blade for weeding and analogous operations, so that a shear cutting action of the weeding blade may be effected to the desired degree.

Other objects will become apparent as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views—

Figure 4 is a horizontal section taken substantially upon line 4—4 of Figure 3; and Figure 5 is a substantially central vertical sectional view of the tool shown in Figure 1.

Figure 2:
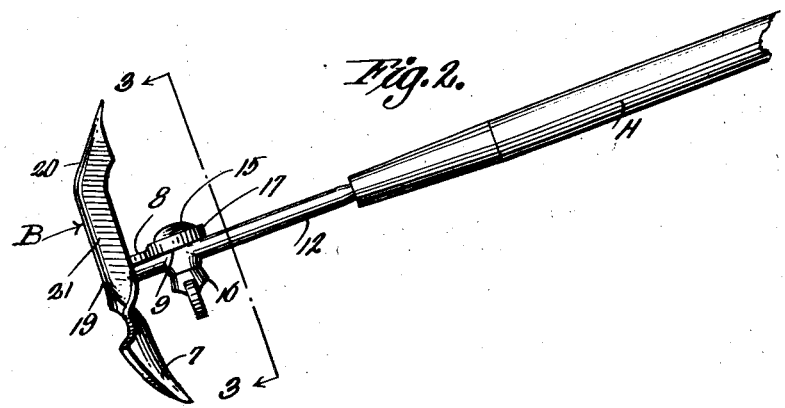
Figure 2 is a side elevational view thereof.

Referring more in detail to the drawings, the form of the invention shown embodies a body member B and an attached handle H. The body member B is stamped from a single elongated sheet of metal of a relatively stiff character so as to provide a head 5 with a plurality of spaced similar depending cultivator or rake teeth 7 of pointed form, said teeth being of arrow head outline and of longitudinally corrugated form so as to have convexed forward surfaces and be of durable form as well as of an efficient nature for cultivating and raking operations. As shown clearly in Figure 5, the teeth 7 are bent forward slightly relative to the head 5 so that they will assume a desirable inclined position when the tool is used with the handle H positioned at an inclination as shown in Figure 2. The plate or sheet from which the body member B is formed has its central portion partially severed therefrom and bent forwardly so as to provide a flange 8 along the upper edge of the head 5 and projecting forwardly from the upper edge of the latter, the end portions of this flange being removed to provide the enlarged intermediate portion or segmental adjusting plate portion 9. The head 5 is formed intermediate its ends with a transverse horizontally elongated opening or slot 10, and a vertical forwardly depressed portion or corrugation 11 extending downwardly from the lower edge of the opening or slot 10 and into the upper end portion of the central rake tooth 7. The handle H has a shank rigid with the lower end thereof in the form of a rod 12 whose free end portion is bent downwardly at right angles as at 13 so as to form a pivot pin adapted to fit and turn in the corrugation 11 when the free end portion of the rod 12 is inserted through the opening or slot 10, whereby the handle is pivotally attached to the body portion B as well as removable therefrom. The adjusting plate or ear 9 is formed with a marginal arcuate slot 14 concentric with the pivot formed by the pin portion 13 of the shank or rod 12 and the corrugation 11, and a bolt 15 is passed through the slot 14 and an aperture in the intermediate portion of the shank or rod 12 and has a clamping nut 16 threaded upon the projecting end of the stem thereof, whereby, upon tightening the nut, the handle and body portion or member will be releasably held against relative swinging movement. It is thus apparent that upon loosening the nut 16 the body member B may be angularly adjusted relative to the handle as indicated by dotted lines in Figure 4, and that upon subsequently tightening the nut 16, the body member may be retained in the position to which it is adjusted relative to the handle. Obviously, the bolt 15 will, when in place, prevent accidental dis-connection of the handle from the body member, although such dis-connection may be readily effected upon removal of the nut 16 from the bolt 15 and removal of said bolt from the shank 12 and adjusting plate 9. The adjusting plate or ear is provided with an upwardly directed marginal flange 17 for re-enforcing purposes, and this flange may be utilized to engage a flattened side on the head of the bolt 15 to prevent the latter from turning when tightening the nut 16. Obviously, the flange 8 re-enforces the head 5 so as to effectively prevent bending thereof from hard usage. It is further noted that the intermediate portion of the rod 12 is preferably enlarged and flattened so that the opening therethrough for the bolt 15 may be provided without unduly weakening the rod 12 at this point.

Figure 1:
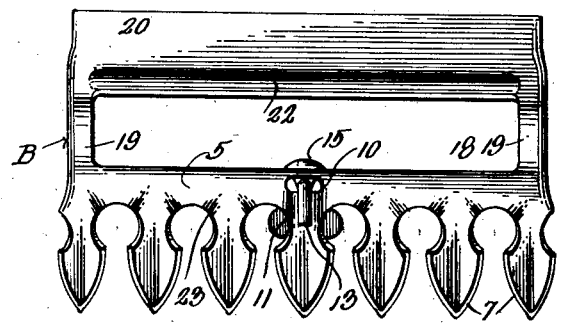
Figure 1 is a rear elevational view of a garden tool constructed in accordance with the present invention.
Figure 3:
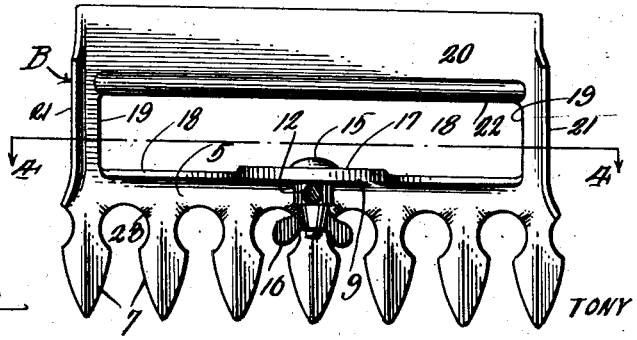
Figure 3 is a section taken upon line 3—3 of Figure 2 and showing the body portion of the tool in front elevation.

The stamping of the plate from which the body member B is formed, so as to provide the flange 8, results in the production of a relatively wide horizontally elongated opening 18 that extends substantially from end to end of the plate and results in the production of a pair of upwardly projecting arms 19 extending from and integral with the ends of the head 5, and a hoe or weeding blade 20 integral with and connecting the upper ends of the arms 19. Forwardly directed right angular flanges 21 are provided upon the outer edges of the arms 19, and these flanges 21 extend along the ends of the head 5 and the blade 20 so that bending of the head 5 and blade 20 relative to the arms as well as bending of the arms will be effectively prevented under ordinary conditions of use. The body member B is originally shaped so that the blade 20 is directed forwardly at an obtuse angle to the arms 19 as shown in Figure 5 so that the blade 20 will assume an inclined position when the tool is inverted from the position of Figure 5 and the handle held in an inclined position as shown in Figure 2. The degree of inclination at which the handle H is held when using the blade 20 will be determined by the depth at which the blade is desired to enter the ground, and where severing the stalks of weeds above the ground, the blade 20 may be disposed to rest flatly against the surface. Obviously, when the blade 20 is used to pass beneath the surface, the soil and severed upper portions of weeds will pass through the opening 18 upon the forward movement of the tool caused by drawing the handle H toward the user. When using the blade 20 it is desirable to adjust the body portion or member B to an angular position relative to the handle so as to provide a shearing operation of the tool. The adjustable connection between the handle and the body member above described, permits of this to any desired degree as dictated by conditions of use, and at the same time, positioning of the body member B at right angles to the handle is made possible so that the most desirable relation of these parts can be had when employing the rake teeth. The blade 20 is formed with a forwardly directed corrugation 22 along the inner longitudinal edge portion thereof so as to prevent bending of the blade 20 at points between its ends, such corrugations extending substantially from end to end of the blade 20 as shown in Figures 1 and 3.

It is noted that the corrugation of the rake or cultivator teeth 7 is preferably extended into the head 5 for a slight distance so as to effectively re-enforce the connection between the teeth and the head 5 whereby bending of said teeth 5 relative to the head is effectively prevented under ordinary conditions. This extension of the corrugated form of the teeth into the head 5 is indicated by shading at 23 in Figures 1 and 3.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:—

1. A tool head of the character described, comprising a body having a longitudinal edge formed to set up a plurality of ground working teeth, each tooth being bent at its face to project at an obtuse angle with respect to one face of the plate, said plate further having the central portion thereof cut away to provide an ear bent outwardly at right angles to the face of the plate for the attachment of a handle thereto, and said other longitudinal edge having a portion thereof bent at an obtuse angle to one face of the plate body to set up a weeding blade extending throughout the length of said other longitudinal edge, and a reinforcing flange formed across each end of said plate body to prevent bending of the same while in use.

2. A garden tool head of the character described, comprising an elongated plate body having a relatively narrow portion of one longitudinal edge bent at an obtuse angle to one face of the plate to provide a weeding blade, and further having the central portion thereof cut away to set up a plate designed to be bent to position at right angles to one face of the plate body for the attachment thereto of a handle member, a reinforcing rib formed longitudinally of the plate between said blade and said cut-away portion, and reinforcing flanges formed transversely of the plate at each end to prevent buckling or bending of the same while in use.

In testimony whereof I affix my signature.

TONY C. GATTI.